Figure 2:
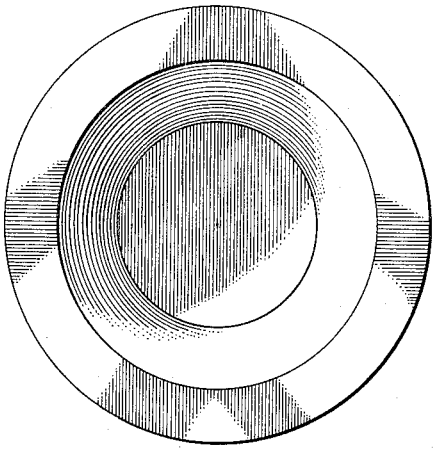
Figure 1:
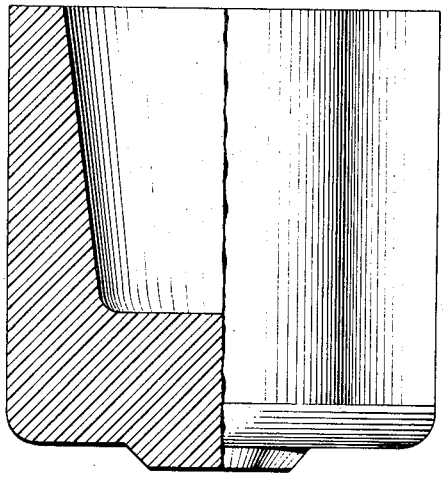

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 2, 1974

921 O.G. 10

T921,006
COMBUSTION CRUCIBLE MATERIAL
Jerry W. Wimberley, Ponca City, Okla., assignor to Continental Oil Company, Ponca City, Okla.
Filed Apr. 30, 1973, Ser. No. 350,546
Int. Cl. H01b *1/00;* B01l *11/02*
U.S. Cl. 252—513
1 Sheet Drawing. 6 Pages Specification

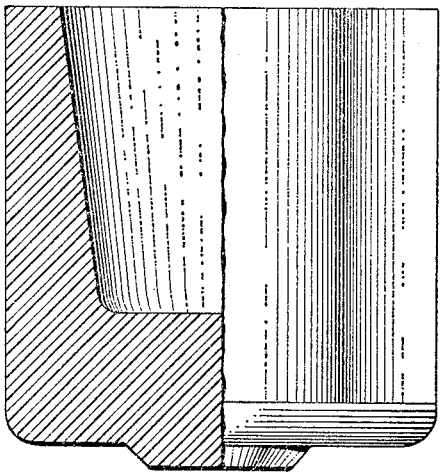

A crucible for the analysis of combustible materials comprising a container, said container being constructed of ceramic materials containing a suitable metal in an amount sufficient to produce heat in said ceramic material when said crucible is placed in a suitable electrical field. The ceramic material containing a suitable metal in an amount sufficient to produce heat in a suitable electrical field is also claimed. A preferred metal is iron, and preferably, said iron is present in an amount equal to about 5 to 20 weight percent of the ceramic material.

COMBUSTION CRUCIBLE MATERIAL

Filed April 30, 1973